No. 826,181.  
PATENTED JULY 17, 1906.  
A. P. MELTON.  
MOLD FOR MAKING BELL MOUTHED CONCRETE PIPE.  
APPLICATION FILED JULY 10, 1905.
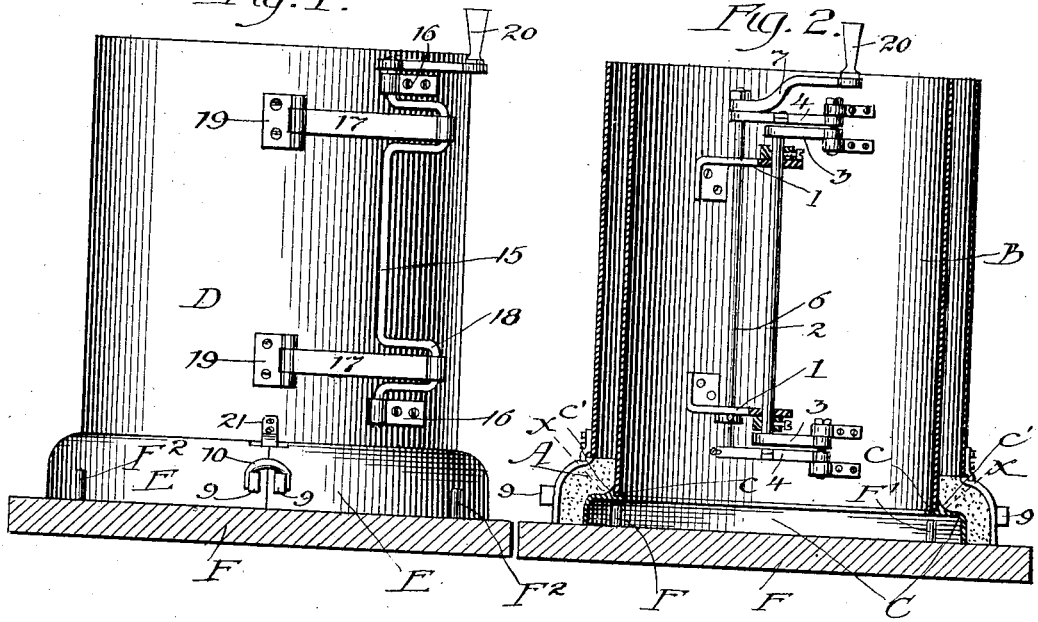

UNITED STATES PATENT OFFICE.

ARTHUR P. MELTON, OF MINNEAPOLIS, MINNESOTA, ASSIGNOR TO MIRACLE PRESSED STONE COMPANY, OF SIOUX FALLS, SOUTH DAKOTA, AND MINNEAPOLIS, MINNESOTA, A CORPORATION OF SOUTH DAKOTA.

MOLD FOR MAKING BELL-MOUTHED CONCRETE PIPE.

No. 826,181.        Specification of Letters Patent.        Patented July 17, 1906.

Application filed July 10, 1905. Serial No. 268,967.

*To all whom it may concern:*

Be it known that I, ARTHUR P. MELTON, a citizen of the United States, residing at Minneapolis, in the county of Hennepin and State of Minnesota, have invented new and useful Improvements in Molds for Making Bell-Mouthed Concrete Pipe, of which the following is a specification, reference being had to the accompanying drawings, forming a part thereof.

The purpose of this invention is to provide an improved mold structure for molding concrete pipe which have a flaring or bell mouth, one important purpose being to avoid the necessity of retaining upon the pipe during the curing process the more expensive mold parts, and so avoiding the necessity for providing a large number of these expensive parts for an operating plant.

It consists of the features of construction set out in the claims.

In the drawings, Figure 1 is a side elevation of a mold embodying this invention. Fig. 2 is a vertical axial section of such mold, showing the bell-mouth portion of the molded pipe therein. Fig. 3 is a vertical section showing the molded pipe and the part of mold which is retained in connection with the pipe during curing, all other parts being removed. Fig. 4 is a top plan view of the mold. Fig. 5 is an axial section of the bell-mouth parts of the mold and a deflector used in filling the bell-mouth cavity in the first step of molding.

The present method of molding bell-mouthed concrete pipe requires a collapsible inner member of the mold and an expansible outer member, which are supported with the bell-mouthed end upward for filling the annular interspace between them with the concrete and tamping it in to form the pipe. In its green or soft condition the straight cylindrical portion of the pipe will sustain its own weight without injury during the curing process; but the bell-mouth at the upper end if not supported exteriorly tends to collapse or subside and become distorted by its own weight before the concrete is sufficiently cured to carry that weight, overhanging, as it does, from the junction of the bell with the body. Therefore while the inner element of the mold may be withdrawn after the molding is completed the outer element is necessarily left in position, retaining the molded pipe until it is sufficiently dry to carry the weight of the bell-mouth piece safely. The outer member of the mold is the more expensive part, and the continuous manufacture of such pipes for this method requires a large investment in these outer members of the mold, making an expensive plant.

The present invention consists in a mold having the cylindrical or body portion of the inner member separable from the bell-mouth portion, and preferably having also the outer element constructed with the cylindrical portion separable from the bell-mouth portion.

A represents the pipe formed in the mold.

B is the cylindrical or body element of the inner member of the mold.

C is the bell-mouth element of the inner member.

D is the cylindrical body element of the outer member. The bell-mouth element of said outer member comprises two similar parts E E and means for securing them together hereinafter described. The bell-mouth element C of the inner member may be a single integral form exteriorly shaped according to the dimensions and configuration desired at the inner surface of the bell-mouth, and for the ordinary form of such pipe it is a simple metal annulus, angle form in cross-section, with a slightly-rounded exterior corner, the outer or peripheral vertical flange of the angular annulus being slightly tapered, so as to draw from the concrete pipe as a pattern draws from the sand and as customary in molding such articles. It is thereby adapted to be withdrawn bodily and in one piece from the bell-mouthed pipe after the latter is fully cured. The horizontal flange of this element is preferably rabbeted at the inner circumference, as seen at c, a bead or fillet c′ being thrown up bounding the rabbet, and in the rabbet the lower end of the cylindrical or body element B of the inner member of the mold is stepped and expanded to fit the rabbet closely. For the purpose of thus expanding this cylindrical element of the inner member any convenient construction may be employed. I have shown the means for that purpose, which are described fully in Patent No. 778,907, granted to Levi Shell January 3, 1905, comprising brackets 1 1, secured rigidly to the inner side of the cylindrical body element B, and mounted in these brackets 1 the vertical shaft 2, from whose ends links 3 3 extend to the inner lapped edge of the cylindrical shell to which the links are pivotally connected, and from the same pivots links 4 4 extend to the arms 5 5 of a rock-shaft 6, which is journaled in the brackets near the circumference of the cylinder, said rock-shaft being provided with the lever-arm 7 at the upper end for rocking the shaft. When the shaft is rocked to fold the joints at which the links 4 4 and the lever-arms 5 5 are connected, the cylinder-shell is collapsed or reduced in diameter, and when the shaft is rocking to bring the links in line with the lever-arms it is expanded. The outer lapped edge of the shell is chamfered off to avoid forming a shoulder on the inner face of the pipe. The two parts E E of the bell-mouth element of the outer member are each provided with lugs 9 9, projecting outwardly at their proximate ends, and three-sided clamps or double hooks 10 10 are provided, adapted to be driven over lugs which are suitably recessed at their opposite outer faces to seat the clamps, a slight taper being given to these outer faces and corresponding taper to the bars of the clamps, so that in driving the clamps onto the lugs the two parts E E are drawn tightly together at their junction edges, each part constituting one-half of the bell-mouth and the junction being at the diametric plane.

The cylindrical or body element D of the outer mold member is formed of heavy sheet metal or plate with the edges lapped similarly to the corresponding elements of the inner member, and any suitable means may be employed for tightening or closing up this element adapted to relax it for the slight expansion necessary to permit it to be withdrawn endwise from the molded body. I have shown as the means for contracting and expanding this element of the outer member of the mold the devices shown in said Patent No. 778,907, consisting in a rock-shaft 15, journaled in suitable clips 16 upon the outer side of the cylindrical shell D, said rock-shaft being bent to form cranks 18 18 between the clips 16 and these cranks being connected by links 17 17 with the other or inner lapped ply or edge of the shell, clips 19 19 being riveted thereonto for connection of the links 17 therewith. A lever-handle 20 on the rock-shaft 15 serves for rocking it to swing the crank-wrists down upon the outer surface of the shell at the side remote from the clips 19 for contracting the shell or up from said surface and over toward the clips 19 for expanding it to permit its withdrawal.

It will be understood that any other suitable means for expanding and contracting the shell may be employed.

The lower end of the shell D is adapted to be stepped upon the upper edge of the bell-mouth elements E E the inner surface of the shell being flush with the inner edge of said bell-mouth as nearly as may be. For retaining it thus accurately stepped on the bell-mouth element lugs 21 21 are bolted to the shell D near the lower edge and offset outwardly therefrom and extended to project somewhat below the lower end, and the bell-mouth members E E are cut away or rabbeted at 22 22 to afford engagement for the lugs which thus check the shell against lateral movement which would displace its lower end from the upper position, stepped, as described, on the upper end of the bell-mouth element.

In the use of this mold the bell-mouth element B of the inner member is lodged on any suitable supporting-plate, as a board F, which may be provided with three pins or studs F' F' F' for locating and centering such member, and the two parts E E of the bell-mouth element of the outer member are then lodged on the board and secured together by the clamps 10 and centered by three studs $F^2$ $F^2$ $F^2$, with which the board is provided for that purpose. A cone-shaped hood G, whose mouth is fitted to the inner circumference of the inner bell-mouth element B, is lodged thereon in the rabbet $c$, in which the cylindrical body element C of the inner member is ultimately to be stepped, said hood being cylindrical at its lower margin for a short distance, so as to fit the rabbet and keep it clear to receive the said inner cylindrical element C at the proper stage. While the hood is in place the concrete is tamped into the annular cavity between the two bell-mouth elements of the inner and outer mold members, respectively, and the bell portion of the pipe is thereby formed up to the top of the outer member and as far up as the cylindrical portion of the hood, preferably leaving the concrete surface sloped downward from the outer to the inner circumference, as indicated by the dotted line $x$ $x$ on Fig. 2. The hood G is then removed and the cylindrical or body element B of the inner mold member is put into place, stepped, as described, on the bell-mouth element C of said inner member. The molding of the pipe may be now continued by tamping in material until it is level up to the top of the outer bell element. The cylindrical or body element D of the outer member is now put in position upon the top of the bell element E E, and the molding of the pipe is completed by tamping material to fill the annular interspace between the two cylindrical elements. When this process is completed, the inner cylindrical body element B being contracted by the means described may be withdrawn endwise. The corresponding cylindrical body element D of the outer member being expanded by the means described may be then similarly withdrawn.

The clamps being withdrawn, the two parts E E of the bell element of the outer member may be withdrawn, and the molded pipe may then be left to cure, standing on the supporting-board F with the bell-mouth element of the inner member supporting the bell of the pipe and upholding the cylindrical body element by extending under its lower end within the bell. By this means the only part of the mold which it is necessary to provide in multiple in order to leave it with the molded pipe during curing is the smallest, simplest, and cheapest of all the parts—namely, the simple angular annulus C.

I claim—

1. A mold for a bell-mouthed concrete pipe comprising an inner member consisting of a bell-mouth part at the bottom and a cylindrical body part stepped on the top of the bell-mouth part and contractible while so stepped thereon and separable therefrom by direct lifting, and an outer member also consisting of a bell-mouth part at the bottom and a cylindrical body part stepped on the top of the bell-mouth part and expansible while so stepped and separable therefrom by direct lifting.

2. A mold for a bell-mouthed concrete pipe comprising an inner member consisting of a bell-mouth part at the bottom interiorly rabbeted at its upper end; a contractible cylindrical body part stepped in the rabbet at the top of the bell-mouth part and adapted to be separated therefrom by direct lifting, and an outer member consisting of a bell-mouth part at the bottom and an expansible cylindrical body part stepped on the bell-mouth bottom part and separable therefrom by direct lifting.

In testimony whereof I have hereunto set my hand, in the presence of two witnesses, at Minneapolis, Minnesota, this 20th day of June, 1905.

ARTHUR P. MELTON.

Witnesses:
L. SOPHIA BREVIG,
MABEL McPHEE.